United States Patent [19]

Samela et al.

[11] Patent Number: 5,465,042
[45] Date of Patent: Nov. 7, 1995

[54] INACTIVE STATE TERMINATION TESTER

[75] Inventors: Francis M. Samela, Lombard; Joseph R. Llorens, Winfield, both of Ill.

[73] Assignee: Methode Electronics, Inc., Chicago, Ill.

[21] Appl. No.: 285,970

[22] Filed: Aug. 4, 1994

[51] Int. Cl.$^6$ ...................................................... G01R 27/16
[52] U.S. Cl. ........................ 324/71.1; 324/525; 324/705; 324/713; 370/85.1; 367/13; 340/635
[58] Field of Search ..................................... 324/512, 523, 324/525, 691, 705, 713, 71.1; 370/85.1; 367/13; 340/514, 635

[56] References Cited

U.S. PATENT DOCUMENTS

| | | | |
|---|---|---|---|
| 5,179,341 | 1/1993 | Whiteside | 324/523 |
| 5,313,105 | 5/1994 | Samela et al. | 307/99 |

OTHER PUBLICATIONS

Bill Stanley (Member of the technical staff at adaptec), Automatic Termination Method 2, Jun. 8, 1994, pp. 5–7 contained in the Plug and Play SCSI Workshop.

*Primary Examiner*—Kenneth A. Wieder
*Assistant Examiner*—Glenn W. Brown
*Attorney, Agent, or Firm*—Eddie L. Bishop; David L. Newman

[57] ABSTRACT

An inactive state termination tester for determining the number of terminators connected to a bus when the bus is inactive. The termination tester monitors the bus for determining when it is inactive. During the periods of bus inactivity, the termination tester senses the bus to determine the number of terminators connected to the bus. The termination tester then displays how many terminators were detected.

17 Claims, 2 Drawing Sheets

INACTIVE STATE TERMINATION TESTER

BACKGROUND OF THE INVENTION

This invention relates generally to terminator devices and in particular, it relates to a detection method and apparatus used with a bus for detecting the number of terminators connected to the bus transmission lines.

One application where reliable data transfers are important is in the field of data transmissions on a bus transmission line for communication between a plurality of peripherals and a central processing unit in a small computer. For example, a Small Computer System Interface (SCSI) bus provides for such a communication link.

As is generally known in the art of designing bus transmission lines, a terminator, comprising of a resistor network, is typically connected to each of the physical ends of the bus in order to eliminate line reflection created by the transmission of signals on the bus. Both of the terminators have a characteristic impedance equal to that of the bus.

Many peripherals, such as disk drives, are adapted to connect to the bus. These peripherals are usually equipped with a bus terminator which is to be removed if the peripheral is not connected to one end of the bus. However, with the addition and removal of various peripherals from the bus, terminators may inadvertently be omitted or more than one terminator may be inadvertently connected to the bus.

Visual verification of the number of terminators connected to the bus normally requires the system to be turned off and the system components disassembled. However, there are prior art designs which measure the number of terminators connected to the bus, but all of these designs share the same disadvantage of requiring the computer system to be rendered inactive in order for the bus to be tested.

Therefore, there is a need for a diagnostic apparatus which has the ability to determine the number of terminators present on a bus without deactivating the computer system. The present invention is such an apparatus.

In view of the above, it is an object of the invention to determine if the bus is active. If the bus is found to be inactive, the diagnostic phase commences.

It is another object of the present invention to determine the number of terminators connected to the bus.

It is still another object of the present invention to display the number of terminators connected to the bus.

SUMMARY OF THE INVENTION

In one form of the invention, an inactive state termination tester determines the number of terminators connected to a bus when the bus is established to be in an inactive state. The termination tester operates by monitoring the bus to determine when it is inactive. When the bus is determined to be inactive, the termination tester senses the bus to determine how many terminators are connected to the bus. The termination tester then displays how many terminators were detected.

Various means for practicing the invention and other advantages and novel feature thereof will be apparent from the following detailed description of an illustrative preferred embodiment of the invention.

BRIEF DESCRIPTION OF THE DRAWINGS

There is shown in the drawing a presently preferred embodiment of the present invention, wherein like numerals in the various figures pertain to like elements, and wherein.

DETAILED DESCRIPTION OF THE PRESENTLY PREFERRED EMBODIMENTS

Figure 1:
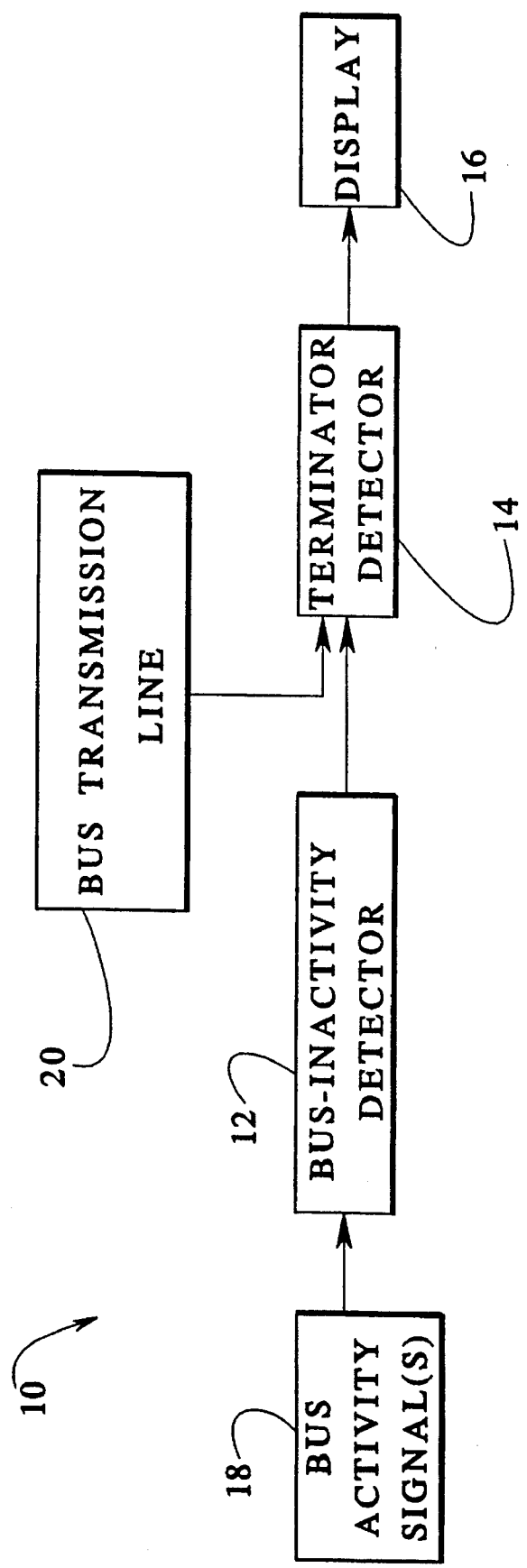
FIG. 1 is a functional block diagram of an inactive state termination tester apparatus.

Referring to the drawing, and particularly to FIG. 1, a functional block diagram of an inactive state termination tester apparatus 10 is depicted with a bus-inactivity detector 12, a terminator detector 14, and a display 16.

The bus-inactivity detector 12 is adapted to be used with or connected to a bus and receive a bus activity signal(s) 18 indicating if the bus is either active or inactive. When the bus is inactive, the bus-inactivity detector 12 transmits a signal to the terminator detector 14 indicating that testing of the bus should commence. The terminator detector 14 then determines the number of terminators connected to the bus transmission line 20 and this result is received and presented by the display 16.

Figure 2:
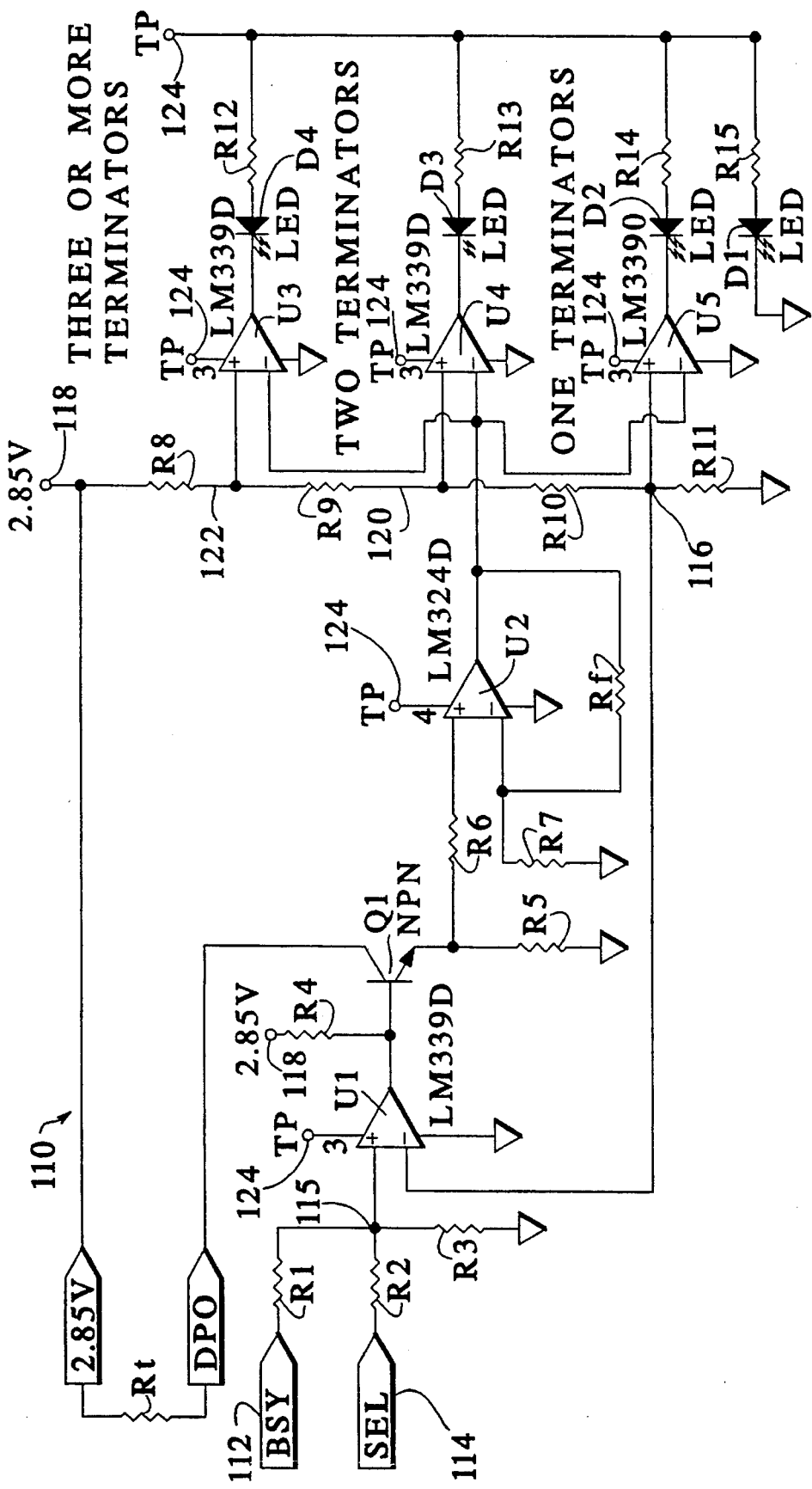
FIG. 2 is a detailed schematic circuit diagram of an inactive state termination tester apparatus constructed in accordance with the principles of the present invention for use with or connected to a SCSI bus.

Turning to FIG. 2, an inactive state termination tester apparatus 110 is depicted which is constructed in accordance with the principles of the present invention for use with a SCSI bus. It is to be understood that the embodiment shown in association with a SCSI bus is not intended to serve as a limitation upon the scope or teaching thereof, but is merely for the purpose of convenience of illustration of one example of the invention's application.

The inactive state termination tester apparatus 110 which is used with or connected to the SCSI bus includes a comparator U1 which is configured as a logic AND gate for the purpose of determining when the SCSI bus is inactive. To accomplish this task, one end of a resistor R1 is connected to the BUSY signal 112 of the SCSI bus and the other end of the resistor is connected to the non-inverting input of the comparator U1. Likewise, one end of a resistor R2 is connected to the SELECT signal 114 of the SCSI bus with the other end of the resistor connected to the non-inverting input of the comparator U1. Also, a resistor R3 is connected to the non-inverting input of the comparator U1 and the other end of the resistor is connected to ground. The connecting of the resistors R1, R2, and R3 to the non-inverting input of the comparator U1 results in a voltage divider 115 of the BUSY signal 112 and the SELECT signal 114.

To complete the logic AND gate configuration of the comparator U1, a +0.77 volt reference 116 is applied to the inverting input of the comparator. The + 0.77 volt reference 116 is provided by connecting resistors R8, R9, R10, and R11 in series, respectively, with the end of the resistor R11 connected to ground and the end of the resistor R8 connected to a +2.85 voltage source 118. Resistors R9, R10, and R11 are chosen to be of equal value and resistor R8 is chosen in order for the +0.77 volt reference 116 to be provided at the junction of resistors R10 and R11. It is preferred that the +2.85 voltage source 118 only vary between ±5 millivolts to ±15 millivolts and be provided by a voltage regulator resident on a SCSI bus terminator such as that depicted in FIG. 2 (prior art) of U.S. Pat. No. 5,313,105 (1994), issued to Samela et at. Therefore, in order for the inactive state termination tester apparatus to be connected to the SCSI bus terminator voltage regulator, it is also preferred that the inactive state termination tester apparatus be mounted onto a SCSI bus terminator.

A pull-up resistor R4 is connected to the +2.85 voltage source 118 and the other end of the resistor connects to the output of the comparator U1. The pull-up resistor R4 pulls the output of the comparator U1 to a high level when the comparator output is in an "open" state.

Also connected to the output of the comparator U1 is the base of an NPN transistor switch Q1. The collector of the transistor switch Q1 is connected to a bus transmission line DP0 which is part of the SCSI bus and is preferably that of the parity transmission line. Correspondingly, the bus transmission line DP0 connects to one end of all terminators (terminators are not shown in FIG. 2) attached to the SCSI bus. Likewise, the opposite end of all terminators attached to the SCSI bus are connected to the +2.85 voltage source 118. The total resistance of all terminators connected between the bus transmission line DP0 and the +2.85 voltage source 118 is referred to as the terminator resistance Rt.

The emitter of the transistor switch Q1 is connected to a sensing resistor R5 which has its other end connected to ground. Furthermore, the emitter of the transistor switch Q1 also attaches to one end of a resistor R6 and the opposite end of the resistor is connected to the non-inverting input of an amplifier U2.

The amplifier U2 is configured as a non-inverting amplifier having a gain such that the voltage across sensing resistor R5 causes 3.0 volts at the output of the amplifier when the terminator resistance Rt equals that of three (3) terminators connected to the SCSI bus. To set the gain of the amplifier U2, a resistor R7 is connected to ground with its other end connected to the inverting input of the amplifier U2. Likewise, one end of a feedback resistor Rf is connected to the inverting input of the amplifier U2 and the other end of the feedback resistor is connected to the output of the amplifier.

The output of the amplifier U2 is connected to the inverting inputs of comparators U3, U4, and U5. The non-inverting input of U5 is connected to the +0.77 voltage reference 116. Likewise, the non-inverting input of U4 is connected a +1.54 voltage reference 120 provided at the junction of resistors R9 and R10. Furthermore, the non-inverting input of U3 is connected to a +2.31 voltage reference 122 provided at the junction of resistors R8 and R9.

To provide the +1.54 voltage reference 120 and the +2.31 voltage reference 122, the resistors R9, R10, and R11 are chosen to be of equal value and resistor R8, as described previously, was chosen so that the voltage at the junction of resistors R10 and R11 is approximately +0.77 volts. This resistor combination will cause the voltage at the junction of R9 and R10 to essentially be two times +0.77 volts and the voltage at the junction of R8 and R9 to essentially be three times +0.77 volts. These voltage levels are preferred in order that the inactive state termination tester apparatus effectively detects the various terminator types defined by the SCSI-2 specification.

The output of comparator U3 is connected to the cathode of a light emitting diode (LED) D4. The anode of LED D4 is connected to one end of a resistor R12 and the other end of the resistor is connected to a termination power supply voltage TERMPOWER (TP) 124, which typically is at +5.0 volts but can be varied in the range of +4.25 volts to +5.25 volts in accordance with ANSI specification X3T9.2/86-109REV10c. Likewise, the output of comparator U4 is connected to the cathode of a LED D3. The anode of LED D3 is connected to one end of a resistor R13 and the other end of the resistor is connected to TP 124. Finally, the output of comparator U5 is connected to the cathode of a LED D2. The anode of LED D2 is connected to one end of a resistor R14 and the other end of the resistor is connected to TP 124.

One end of a resistor R15 is also connected to TP 124 with the other end of the resistor connected to the anode of a LED D1. The cathode of the LED D1 is connected to ground.

In the embodiment shown in FIG. 2, the comparators U1, U3, U4, and U5 are all part of a single integrated chip which has a voltage input pin 3 which is connected to TP 124. Similarly, voltage input pin 4 of the amplifier U2 is connected to TP 124.

The operation of the inactive state termination tester for use with a SCSI bus will now be explained with reference to FIG. 2. In particular, it must be recognized that a SCSI system communicates using a well defined protocol. One of the elements of the protocol is a means of determining if the bus is active or inactive. The SCSI bus is known to be inactive when the BUSY signal line and the SELECT signal line are simultaneously at a high logic level.

When the BUSY signal 112 is inactive (i.e., at a high logic level of greater than +2.5 volts), and the SELECT signal 114 is inactive (i.e., also at a high logic level of greater than +2.5 volts), the voltage formed at the non-inverting input of comparator U1 will be greater than the +0.77 voltage reference 116 connected to the inverting input of the comparator. This will result in the output of the comparator U1 to be pulled to a high logic level, thereby indicating the logical AND condition of the BUSY signal 112 and the SELECT signal 114. It may be shown that other combinations of the BUSY and the SELECT logic voltage levels will produce a voltage at the non-inverting input of comparator U1 which is less than the inverting reference voltage of 0.77 volts. In these cases the output of comparator U1 will go to a low logic level, thereby indicating the absence of the logical AND condition of the BUSY and the SELECT signal lines.

The diagnostic phase begins when the terminator resistance Rt is connected to sensing resistor R5 through the transistor switch Q1.

The base of the transistor switch Q1 is controlled by the output of comparator U1. When the logical AND condition of the BUSY signal 112 and the SELECT signal 114 is met, the transistor switch Q1 is rendered conductive, thereby connecting the terminator resistance Rt associated with bus transmission line DP0, through the transistor switch Q1, to the sensing resistor R5. The voltage at the junction of the terminator resistance Rt and sensing resistor R5 will be dependent upon the number of terminators present in the system. Correspondingly, the output voltage of amplifier U2 will be an indication of the number of terminators connected to the bus.

Since the terminators are connected to the bus in parallel, as the number of terminators present on the bus increase, the equivalent terminator resistance Rt will decrease. Thus, both the voltage at the sensing resistor R5 and the output voltage of amplifier U2 will increase as the number of terminators present on the bus increase.

Correspondingly, the output voltage of the amplifier U2 will exceed the voltage applied to the non-inverting input of the comparator U5 when one terminator is connected to the bus. Likewise, the output voltage of the amplifier U2 will exceed the voltage applied to the non-inverting input of both comparator U4 and comparator U5 when two terminators are connected to the bus. Finally, the output voltage of the amplifier U2 will exceed the non-inverting input of comparators U3, U4, and U5 when three or more terminators are connected to the bus.

When the voltage applied to the inverting input of comparator U3, U4, and/or U5 exceeds the voltage applied to the non-inverting input of a comparator, the output of the comparator will go to a low logic level. When the comparator's output is at the low logic level current will flow through the LED, causing it to light, thereby indicating the number of terminators present in the system.

LED D2 will illuminate when one terminator is attached to the bus. Likewise, LED D2 and LED D3 will illuminate when two terminators are connected to the bus. Furthermore, LED D2, LED D3, and LED D4 will illuminate when three or more terminators are detected.

As a way of ensuring that power is applied to the inactive state termination tester 110, LED D1 will illuminate when the TP 124 voltage is applied to the termination tester.

For completeness in the disclosure of the above-described inactive state termination tester apparatus, when it is used in conjunction with a SCSI bus, but not for purpose of limitation, the following representative values and component identifications are submitted. These values and components were employed in an inactive state termination tester apparatus that was constructed and tested and which provides a high quality performance. Those skilled in the art will recognized that many alternative elements and values may be employed in constructing the circuity in accordance with the present invention.

| Part | TYPE or VALUE |
| --- | --- |
| R1 | 3.9K Ohms |
| R2 | 3.9K Ohms |
| R3 | 1K Ohms |
| R4 | 470 Ohms |
| R5 | 10 Ohms |
| R6 | 1K Ohms |
| R7 | 1K Ohms |
| R8 | 680 Ohms |
| R9 | 1K Ohms |
| R10 | 1K Ohms |
| R11 | 1K Ohms |
| R12–15 | 225 Ohms |
| Rf | Select |
| D1–D4 | HLMP1585 |
| Q1 | 2N2222 |
| U1 | LM339D |
| U2 | LM324D |
| U3–U5 | LM339D |

As previously stated above, the value of the feedback resistor Rf is selected in order for 3.0 volts to be present at the output of the amplifier U2 when the terminator resistance Rt equals that of three (3) terminators connected to the SCSI bus. The feedback resistor Rf is selected because it is an easy way to compensate for the error tolerances of the other components used in the manufacture of the inactive state termination tester.

It should be understood that various changes and modifications to the presently preferred embodiments described herein will be apparent to those skilled in the art. Such changes and modifications may be made without departing from the spirit and scope of the present invention and without diminishing its attendant advantages. For example, with minor variations, an inactive state termination tester can be used in conjunction with a VMEbus or any other various data transmission line configurations. Therefore, it is intended that such changes and modifications be covered by the appended claims.

We claim:

1. An inactive state termination tester for determining the number of terminators connected to a bus, said inactive state termination tester comprising:
   a) means for detecting bus inactivity to produce a bus inactivity signal; and
   b) means for detecting said number of terminators connected to said bus, when said bus inactivity signal is received, to produce a terminator detection signal corresponding to said number of terminators connected to said bus.

2. The inactive state termination tester of claim 1, which further comprises means for providing a display corresponding to said terminator detection signal to indicate said number of terminators connected to said bus.

3. The inactive state termination tester of claim 1, which further comprises means for determining if power is applied to said inactive state termination tester.

4. An inactive state termination tester for determining the number of terminators connected to a SCSI bus, said inactive state termination tester comprising:
   a) means for detecting when the SCSI bus is inactive to produce a SCSI bus inactivity signal; and
   b) means for determining the number of terminators connected to said SCSI bus, when said SCSI bus inactivity signal is received, to produce a terminator detection signal corresponding to said number of terminators connected to said SCSI bus.

5. The inactive state termination tester of claim 4, wherein said SCSI bus inactivity detection means comprises a voltage divider connected to the BUSY signal and the SELECT signal of said SCSI bus to provide a voltage divider output to indicate that said SCSI bus is inactive.

6. The inactive state termination tester of claim 5, wherein said SCSI bus inactivity detection means further comprises means for comparing said voltage divider output to a voltage reference to provide said SCSI bus inactivity signal when said voltage divider output is greater than said voltage reference.

7. The inactive state termination tester of claim 4, wherein said means for determining the number of terminators comprises:
   a) means for sensing the number of terminators connected to said SCSI bus to provide a sense output corresponding to said number of terminators connected to said SCSI bus; and
   b) means for connecting said sensing means to said SCSI bus when said SCSI bus inactivity signal is received.

8. The inactive state termination tester of claim 7, wherein said means for determining the number of terminators further comprises means for amplifying said sense output corresponding to said number of terminators detected on said SCSI bus to provide said terminator detection signal.

9. The inactive state termination tester of claim 4, which further comprises means for providing a display corresponding to said terminator detection signal.

10. The inactive state termination tester of claim 9, wherein said means for providing a display comprises means for visually displaying when less than one terminator is indicated by said terminator detection signal as being connected to said SCSI bus.

11. The inactive state termination tester of claim 9, wherein said means of providing a display comprises means for visually displaying when more than two terminators are indicated by said terminator detection signal as being connected to said SCSI bus.

12. The inactive state termination tester of claim 9, wherein said means of providing a display comprises means for visually displaying when two terminators are indicated by said terminator detection signal as being connected to said SCSI bus.

13. The inactive state termination tester of claim 9, wherein said means of providing a display comprises means for displaying when one, two, or three or more terminators are indicated by said terminator detection signal as being connected to said SCSI bus.

14. The inactive state termination tester of claim 4, wherein said inactive state termination tester further includes:
   a) means for comparing said terminator detection signal to a reference voltage to provide a display signal indicating said number of terminators connected to said SCSI bus; and
   b) means for illuminating an LED corresponding to said display signal indicating said number of terminators connected to said SCSI bus.

15. The inactive state termination tester of claim 4, which further comprises means for determining if power is applied to said inactive state termination tester.

16. A method for determining the number of terminators connected to a bus, said method comprising the steps of:
   a) detecting bus inactivity; and
   b) determining the number of terminators connected to said bus during bus inactivity.

17. The method of claim 16, which further includes displaying said number of terminators connected to said bus.

\* \* \* \* \*